United States Patent
Yoneda et al.

(10) Patent No.: US 11,211,663 B2
(45) Date of Patent: Dec. 28, 2021

(54) BICYCLE BATTERY PACK

(71) Applicant: Shimano Inc., Osaka (JP)

(72) Inventors: Yuya Yoneda, Osaka (JP); Taihei Nishihara, Osaka (JP); Satoshi Shahana, Osaka (JP); Shunki Inoue, Osaka (JP)

(73) Assignee: Shimano Inc., Osaka (JP)

( * ) Notice: Subject to any disclaimer, the term of this patent is extended or adjusted under 35 U.S.C. 154(b) by 108 days.

(21) Appl. No.: 15/911,563

(22) Filed: Mar. 5, 2018

(65) Prior Publication Data

US 2018/0269439 A1    Sep. 20, 2018

(30) Foreign Application Priority Data

Mar. 17, 2017  (JP) .............................. JP2017-053812

(51) Int. Cl.
| | |
|---|---|
| *H01M 50/213* | (2021.01) |
| *B62K 19/30* | (2006.01) |
| *B62J 9/20* | (2020.01) |
| *H01M 50/20* | (2021.01) |
| *B62M 6/55* | (2010.01) |
| *B62M 6/90* | (2010.01) |
| *B62J 6/015* | (2020.01) |
| *B62J 43/00* | (2020.01) |

(Continued)

(52) U.S. Cl.
CPC ............. *H01M 50/213* (2021.01); *B62J 9/20* (2020.02); *B62K 19/30* (2013.01); *B62M 6/55* (2013.01); *B62M 6/90* (2013.01); *H01M 50/20* (2021.01); *B62J 1/08* (2013.01); *B62J 6/015* (2020.02); *B62J 6/02* (2013.01); *B62J 43/00* (2020.02); *B62J 45/20* (2020.02); *B62J 50/20* (2020.02); *B62J 99/00* (2013.01); *B62J 2001/085* (2013.01); *B62K 23/02* (2013.01); *B62K 25/04* (2013.01); *H01M 2220/20* (2013.01)

(58) Field of Classification Search
CPC .... H01M 2/105; H01M 50/213; H01M 50/20; B62J 9/001; B62J 1/08; B62J 6/003; B62J 6/02; B62J 99/00; B62J 2001/085; B62J 2099/0013; B62J 2099/0026; B62M 6/55; B62M 6/90; B62K 23/02; B62K 25/04; B62K 2208/00
See application file for complete search history.

(56) References Cited

U.S. PATENT DOCUMENTS

| 6,148,944 A * | 11/2000 | Adomi ...................... B62M 6/90 180/220 |
| 2013/0118825 A1* | 5/2013 | Kwag ...................... B62M 6/90 180/220 |

FOREIGN PATENT DOCUMENTS

| CN | 1132151 A | 10/1996 |
| CN | 1087248 C | 7/2002 |

(Continued)

*Primary Examiner* — Helen Oi K Conley
(74) *Attorney, Agent, or Firm* — Global IP Counselors, LLP

(57) ABSTRACT

A bicycle battery pack that can be reduced in volume includes a housing configured to be located on a frame of a bicycle and battery cells accommodated in the housing. The battery cells include at least a first battery cell and a second battery cell. The housing includes a side wall extending in a longitudinal direction of the frame in a state located on the frame. An outer portion of the side wall includes at least one groove. The at least one groove is recessed toward a region between the first battery cell and the second battery cell.

17 Claims, 7 Drawing Sheets

(51) Int. Cl.
  *B62J 45/20* (2020.01)
  *B62J 50/20* (2020.01)
  *B62J 1/08* (2006.01)
  *B62J 6/02* (2020.01)
  *B62J 99/00* (2020.01)
  *B62K 23/02* (2006.01)
  *B62K 25/04* (2006.01)

(56) References Cited

FOREIGN PATENT DOCUMENTS

| | | | |
|---|---|---|---|
| DE | 20 2008 009 933 U1 | 10/2008 | |
| DE | 10 2008 047 087 A1 | 3/2010 | |
| DE | 102010000740 * | 7/2011 | ............. B62M 6/90 |
| DE | 10 2013 204 556 A1 | 9/2013 | |
| DE | 10 2015 003 386 A1 | 9/2016 | |
| EP | 0686521 A2 * | 12/1995 | ............. B60K 1/04 |
| EP | 0716009 A2 * | 6/1996 | ............. B62J 99/00 |
| EP | 2 230 164 B1 | 9/2010 | |
| EP | 2230164 A1 * | 9/2010 | ............. B62K 19/30 |
| EP | 2 532 571 A1 | 12/2012 | |
| EP | 2 532 572 A1 | 12/2012 | |
| EP | 2 532 573 A1 | 12/2012 | |
| EP | 2653371 A1 * | 10/2013 | ............. B62K 19/06 |
| JP | 11-59532 A | 3/1999 | |
| JP | 11-79066 A | 3/1999 | |
| JP | 2010-225336 A | 10/2010 | |
| WO | 2016102579 A1 | 6/2016 | |

* cited by examiner

BICYCLE BATTERY PACK

CROSS-REFERENCE TO RELATED APPLICATIONS

This application claims priority to Japanese Patent Application No. 2017-053812, filed on Mar. 17, 2017. The entire disclosure of Japanese Patent Application No. 2017-053812 is hereby incorporated herein by reference.

BACKGROUND

Field of the Invention

The present invention generally relates to a bicycle battery pack.

Background Information

Some bicycles are provided with a bicycle battery pack for supplying electrical power to one or more electric components of a bicycle. One example of a bicycle battery pack is disclosed in Japanese Laid-Open Patent Publication No. 9-226653 (Patent document 1). Specifically, Patent document 1 discloses a substantially parallelepiped bicycle battery pack.

SUMMARY

One object of the present invention is to provide a bicycle battery pack that can be reduced in volume.

A first aspect of the present invention is a bicycle battery pack including a housing configured to be located on a frame of a bicycle and a plurality of battery cells accommodated in the housing. The plurality of battery cells includes at least a first battery cell and a second battery cell. The housing includes a side wall extending in a longitudinal direction of the frame in a state located on the frame. An outer portion of the side wall includes at least one groove. The at least one groove is recessed toward a region between the first battery cell and the second battery cell. With the bicycle battery pack according to the first aspect, compared to a case in which the outer portion of the side wall of the housing does not include a groove, the volume of the bicycle battery pack can be reduced by an amount corresponding to the volume of the groove. Further, the groove is recessed toward the region between the first battery cell and the second battery cell. This allows the region between the first battery cell and the second battery cell to be effectively used.

In a second aspect of the present invention, the bicycle battery pack according to the first aspect is configured so that the housing is configured to be at least partially accommodated in an accommodation cavity defined in the frame. With the bicycle battery pack according to the second aspect, the bicycle battery pack can be at least partially accommodated in the accommodation cavity.

In a third aspect of the present invention, the bicycle battery pack according to the first aspect or the second aspect is configured so that the at least one groove is formed so that a linear member can be received in the at least one groove. With the bicycle battery pack according to the third aspect, the layout of the linear member in the groove allows the linear member to be laid out without projecting out of the outer portion of the side wall of the bicycle battery pack or allows the linear member to be laid out so that the projection amount from the outer portion of the side wall is reduced. Thus, the linear member does not interfere with the layout of the bicycle battery pack and does not become an obstruction to a user. Further, the layout of the linear member in the groove improves the outer appearance.

In a fourth aspect of the present invention, the bicycle battery pack according to the third aspect is configured so that the at least one groove is formed so that a plurality of linear members can be received in the at least one groove. With the bicycle battery pack according to the fourth aspect, the groove can receive a plurality of linear members. This further improves the convenience.

A fifth aspect of the present invention is a bicycle battery pack including a housing configured to be located on a frame of a bicycle and a plurality of battery cells that are at least partially accommodated in the housing. The housing includes a side wall extending in a longitudinal direction of the frame in a state located on the frame. An outer portion of the side wall includes at least one groove that is formed so that a plurality of linear members can be received in the at least one groove. With the bicycle battery pack according to the fifth aspect, compared to a case in which the outer portion of the side wall of the housing does not include a groove, the volume of the bicycle battery pack can be reduced by an amount corresponding to the volume of the groove. Further, the groove can receive a plurality of linear members. This improves the convenience.

In a sixth aspect of the present invention, the bicycle battery pack according to the fifth aspect is configured so that the plurality of battery cells includes at least a first battery cell and a second battery cell. With the bicycle battery pack according to the sixth aspect, the volume of the bicycle battery pack accommodating the plurality of battery cells can be reduced.

In a seventh aspect of the present invention, the bicycle battery pack according to the sixth aspect is configured so that the at least one groove is recessed in the outer portion of the side wall toward a region between the first battery cell and the second battery cell. With the bicycle battery pack according to the seventh aspect, the groove is recessed toward the region between the first battery cell and the second battery cell. Thus, the region between the first battery cell and the second battery cell can be effectively used.

In an eighth aspect of the present invention, the bicycle battery pack according to any one of the first to fourth, sixth, and seventh aspects is configured so that the first battery cell and the second battery cell are aligned in a direction intersecting the longitudinal direction of the frame in a state where the housing is located on the frame. With the bicycle battery pack according to the eighth aspect, the groove extends in the longitudinal direction of the bicycle battery pack in a state where the bicycle battery pack is located on the frame. This elongates the groove and increases the volume of the groove. Thus, the volume of the bicycle battery pack can be further reduced. The groove extends in the longitudinal direction of the frame. This facilitates the layout of a linear member such as an electric cable, a Bowden cable, or a hydraulic cable.

In a ninth aspect of the present invention, the bicycle battery pack according to any one of the first to fourth aspects is configured so that the at least one groove includes a plurality of grooves on the outer portion of the side wall. The plurality of battery cells further includes a third battery cell. The first battery cell, the second battery cell, and the third battery cell are each located in the housing so as to face an inner portion of the side wall. The plurality of grooves includes a first groove, recessed in the outer portion of the side wall toward a region between the first battery cell and the second battery cell, and a second groove, recessed in the outer portion of the side wall toward a region between the second battery cell and the third battery cell. The bicycle battery pack according to the ninth aspect includes a plurality of grooves. Thus, compared to a case in which the outer portion of the side wall of the housing does not include a groove, the volume of the bicycle battery pack can be further reduced. Further, the number of linear members that can be laid out in the grooves can be increased.

In a tenth aspect of the present invention, the bicycle battery pack according to the ninth aspect is configured so that the first battery cell, the second battery cell, and the third battery cell are aligned in a direction intersecting the longitudinal direction of the frame in a state where the housing is located on the frame. With the bicycle battery pack according to the tenth aspect, the grooves extend in the longitudinal direction of the bicycle battery pack in a state where the bicycle battery pack is located on the frame. This elongates the grooves and increases the volume of the grooves. Thus, the volume of the bicycle battery pack can be further reduced. The grooves extend in the longitudinal direction of the frame. Thus, for example, linear members such as an electric cable, a Bowden cable, and a hydraulic cable can be laid out in parallel.

In an eleventh aspect of the present invention, the bicycle battery pack according to the tenth aspect is configured so that the plurality of battery cells further includes a fourth battery cell. At least one of the first battery cell, the second battery cell, and the third battery cell is aligned with the fourth battery cell in the longitudinal direction of the frame in a state where the housing is located on the frame. With the bicycle battery pack according to the eleventh aspect, at least two battery cells are aligned in the longitudinal direction of the frame. This increases the number of battery cells accommodated in the battery pack.

In a twelfth aspect of the present invention, the bicycle battery pack according to any one of the first to eleventh aspects is configured so that the at least one groove is formed extending from one end of the housing to another end of the housing in the longitudinal direction of the frame in a state where the housing is located on the frame. With the bicycle battery pack according to the twelfth aspect, the groove is elongated. Thus, compared to a case in which the outer portion of the side wall of the housing does not include a groove, the volume of the bicycle battery pack can be reduced.

In a thirteenth aspect of the present invention, the bicycle battery pack according to any one of the first to twelfth aspects is configured so that the at least one groove is formed to be entirely straight. With the bicycle battery pack according to the thirteenth aspect, the structure of the groove is simplified. In a case where a linear member is laid out in the groove, the linear member can be laid out without stress being applied to the linear member.

In a fourteenth aspect of the present invention, the bicycle battery pack according to any one of the first to thirteenth aspects is configured so that the battery cells are cylindrical. With the bicycle battery pack according to the fourteenth aspect, versatile battery cells can be used to form the bicycle battery pack.

In a fifteenth aspect of the present invention, the bicycle battery pack according to any one of the first to fourteenth aspects is configured so that the frame of the bicycle includes a wall defining an accommodation cavity configured to accommodate at least part of the bicycle battery pack. The at least one groove is formed in a portion of the side wall facing the wall in a state where the housing is accommodated in the accommodation cavity. With the bicycle battery pack according to the fifteenth aspect, the groove is covered by the wall of the frame. This reduces the influence the groove has on the outer appearance.

In a sixteenth aspect of the present invention, the bicycle battery pack according to any one of the first to fifteenth aspects further includes a cushion provided on the outer portion of the side wall. With the bicycle battery pack according to the sixteenth aspect, the cushion protects the bicycle battery pack. Further, when the cushion is located between the bicycle battery pack and the frame, the cushion allows the bicycle battery pack to be stably attached to the frame.

In a seventeenth aspect of the present invention, the bicycle battery pack according to the sixteenth aspect is configured so that the cushion is provided in a portion of the side wall proximate to the groove. With the bicycle battery pack according to the seventeenth aspect, for example, the stress applied to a linear member can be reduced if the linear member gets caught between the bicycle battery pack and the frame while laying out the linear member in the groove.

The bicycle battery pack according to the present invention can be reduced in volume.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
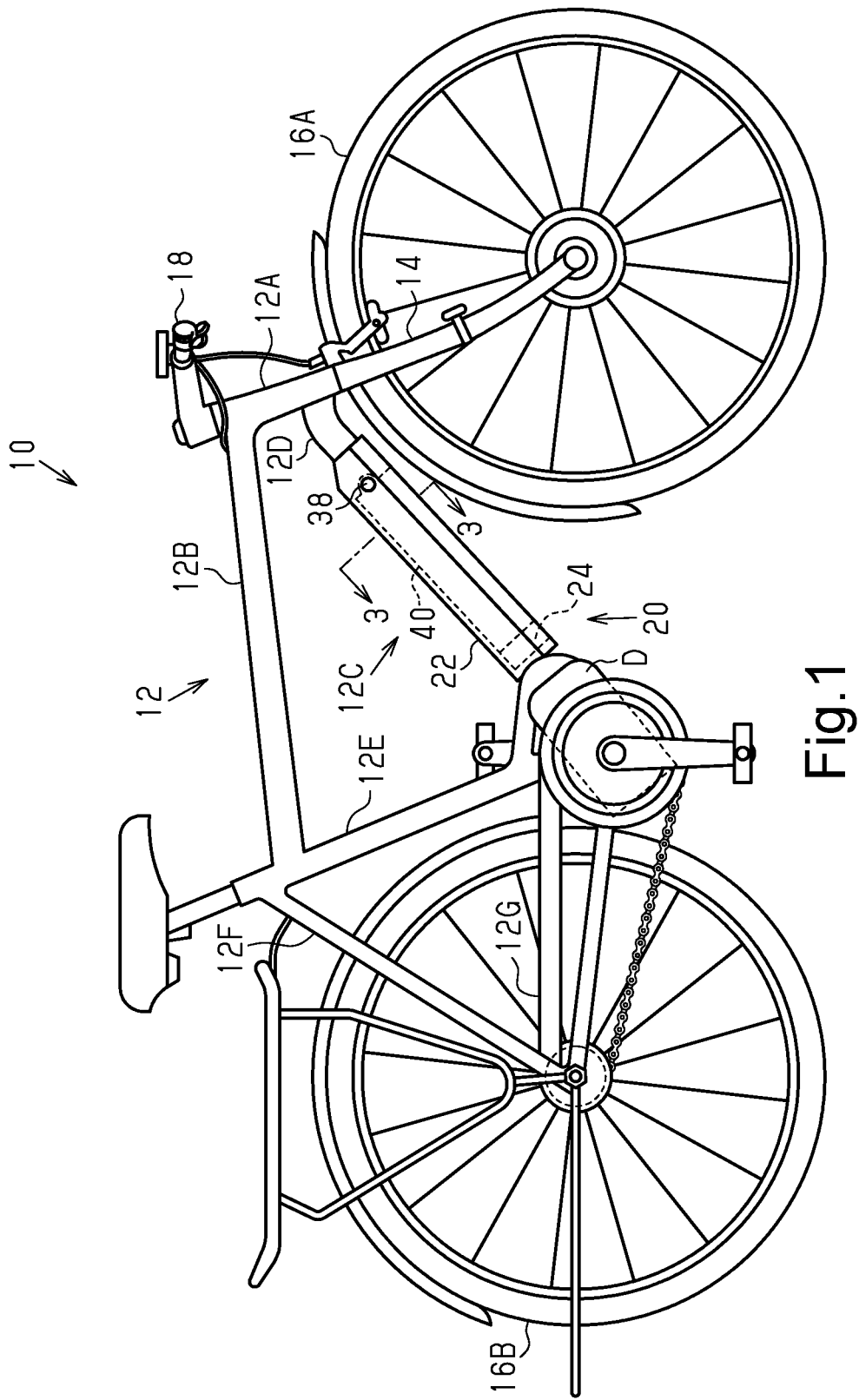
FIG. 1 is a side elevational view showing a bicycle including a bicycle battery pack in accordance with one embodiment.

A bicycle 10 illustrated in FIG. 1 includes a bicycle battery pack 40. The bicycle battery pack 40 will hereafter simply be referred to as the battery pack 40. In one example, the bicycle 10 includes a frame 12 of the bicycle 10, a front fork 14, a front wheel 16A, a rear wheel 16B and a handlebar 18. The frame 12 includes a head tube 12A, a top tube 12B, a down tube 12C, a seat tube 12E, a seat stay 12F and a chain stay 12G. The bicycle 10 is provided with a bicycle electric component including at least one of a drive pack D that assists propulsion of the bicycle 10, an electric shifting device, an electric suspension, an electric seatpost, a display device, a cycle computer, a lamp and an electric operation device. The bicycle electric component is similar to a conventional bicycle electric component, and thus, the bicycle electric component will not be described in detail.

Figure 2:
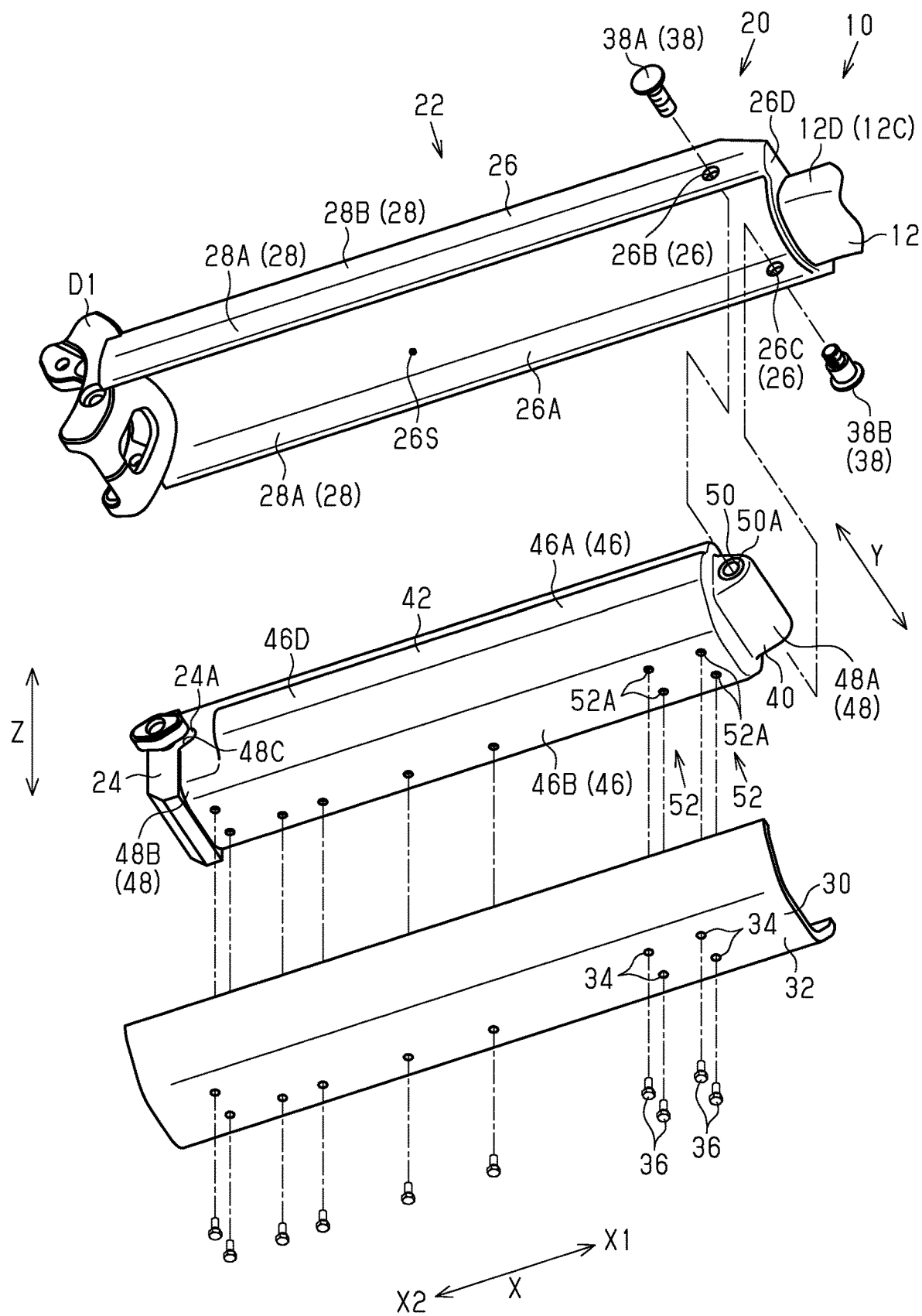
FIG. 2 is an exploded perspective view of the bicycle battery pack shown in FIG. 1 and its attaching structure.

As shown in FIG. 2, the bicycle 10 further includes a battery pack attaching structure 20 of the battery pack 40. The battery pack attaching structure 20 will hereafter simply be referred to as the attaching structure 20. The attaching structure 20 includes a battery attachment 22 and a battery holder 24. The battery attachment 22 is provided on the frame 12 of the bicycle 10. The battery attachment 22 forms part of the frame 12. In the example shown in FIG. 1, the battery attachment 22 forms part of the down tube 12C. The down tube 12C includes a coupling portion 12D, which is coupled to the head tube 12A, and the battery attachment 22. In one example, one end of the battery attachment 22 is connected to the coupling portion 12D, and the outer end of the battery attachment 22 is connected to the seat tube 12E. A drive pack mount D1 can be provided between the battery attachment 22 and the seat tube 12E. The drive pack D (refer to FIG. 1) is mounted on the mount D1. The coupling portion 12D can be formed integrally with the battery attachment 22 or separately from the battery attachment 22. Further, the coupling portion 12D and the battery attachment 22 can be welded or adhered together and integrally joined with each other. The battery attachment 22 can be provided separately from the frame 12.

The battery attachment 22 includes a battery accommodation portion 26. The material of the battery accommodation portion 26 includes metal or fiber-reinforced resin. In one example, preferably, the battery accommodation portion 26 is formed from the same material as the portion of the frame 12 coupled to the battery accommodation portion 26. The battery pack 40 is attached to the battery attachment 22 and at least partially accommodated in the battery accommodation portion 26. An accommodation cavity 26S that accommodates at least part of the battery pack 40 is defined in the battery accommodation portion 26.

Preferably, the battery accommodation portion 26 is designed freely but in conformance with the bicycle 10. The battery accommodation portion 26 is formed to have a substantially U-shaped cross section in a direction orthogonal to a longitudinal direction X. The battery accommodation portion 26 is formed to be, for example, substantially plane-symmetric with respect to a plane extending through the center of the battery accommodation portion 26 in a widthwise direction Y and orthogonal to the widthwise direction Y. The widthwise direction Y is orthogonal to the longitudinal direction X and extends in a left-right direction of the bicycle 10.

The frame 12 includes a plurality of walls 28 defining the accommodation cavity 26S that can accommodate at least part of the battery pack 40. The walls 28 are included in the battery accommodation portion 26. The walls 28 include a pair of side walls 28A and a main wall 28B. The side walls 28A and the main wall 28B each include a surface of the battery accommodation portion 26 extending in the longitudinal direction X. The side walls 28A include side surfaces of the battery accommodation portion 26 in the widthwise direction Y. The side walls 28A are connected to two ends of the main wall 28B in the widthwise direction Y. The walls 28 are shaped to be curved from the main wall 28B toward the two ends in the widthwise direction Y. An end of the walls 28 located toward the head tube 12A (refer to FIG. 1) in the longitudinal direction X is connected to the coupling portion 12D of the down tube 12C. In one example, the battery accommodation portion 26 has an end 26D that is located on the side of the head tube 12A with respect to the longitudinal direction X. The end 26D connects the side walls 28A to the main wall 28B. The end 26D is also connected to the coupling portion 12D of the down tube 12C. The side walls 28A, the main wall 28B and the end 26D are formed integrally with one another. Preferably, the side walls 28A, the main wall 28B and the end 26D are formed as a one-piece member of a single piece of material.

The battery accommodation portion 26 further includes a first opening 26A. The first opening 26A is formed in the battery accommodation portion 26 to open, for example, downward in the height-wise direction Z in a state where the bicycle 10 is located on level ground. The height-wise direction Z is orthogonal to the longitudinal direction X and the widthwise direction Y. The first opening 26A leads to the accommodation cavity 26S of the battery accommodation portion 26. The first opening 26A is formed to have dimensions that allow the battery pack 40 to be inserted into the accommodation cavity 26S. The battery pack 40 is accommodated through the first opening 26A in the accommodation cavity 26S and attached to the battery attachment 22.

The attaching structure 20 further includes a cover 30. The cover 30 is configured to be attachable to and removable from the battery pack 40. The cover 30 includes a cover body 32 and a plurality of through holes 34. The cover body 32 is formed to be, for example, substantially plane-symmetric with respect to a plane extending through the center of the cover body 32 in the widthwise direction Y and orthogonal to the widthwise direction Y. The cover body 32 extends in the longitudinal direction X. Preferably, in a state where the battery pack 40 is attached to the battery attachment 22, the cover body 32 is configured to close the first opening 26A of the battery accommodation portion 26. The two ends of the cover body 32 in the widthwise direction Y are configured to be faced toward the ends of the side walls 28A of the battery accommodation portion 26 in the height-wise direction Z. The accommodation cavity 26S is shaped in conformance with the contour of the battery pack 40 so that the two ends of the cover body 32 in the widthwise direction Y are faced toward the ends of the side walls 28A of the battery accommodation portion 26 in the height-wise direction Z. The cover body 32 can be configured to cover only part of the battery pack 40.

The through holes 34 are formed to allow insertion of bolts 36. The through holes 34 are provided in the cover body 32. In a state where the cover body 32 is attached to the battery pack 40, the through holes 34 are located at positions on the cover body 32 corresponding to holes 52A of the battery pack 40.

The attaching structure 20 further includes engagement portions 38. The engagement portions 38 include a first engagement portion 38A and a second engagement portion 38B. In one example, the first engagement portion 38A and the second engagement portion 38B each include a bolt. The bolt includes a male thread. The battery accommodation portion 26 includes a first hole 26B and a second hole 26C. The first hole 26B allows for the insertion of the first engagement portion 38A, while the second hole 26C allows for the insertion of the second engagement portion 38B. In one example, the first hole 26B is formed in the battery accommodation portion 26 proximate to one end at one side X1 in the longitudinal direction X and in one end in the widthwise direction Y. The second hole 26C is formed in the battery accommodation portion 26 proximate to one end at one side X1 in the longitudinal direction X and in the other end in the widthwise direction Y.

The battery pack 40 is attachable to the battery attachment 22. In a state attached to the battery attachment 22, the battery pack 40 can supply power to an electrical element included in the bicycle 10. The electrical element included in the bicycle 10 includes an electric component. The electric component includes at least one of a drive unit, an electric shifting device, an electric suspension, an electric seatpost, a display device, a cycle computer, a lamp and an electric operation device.

Figure 3:
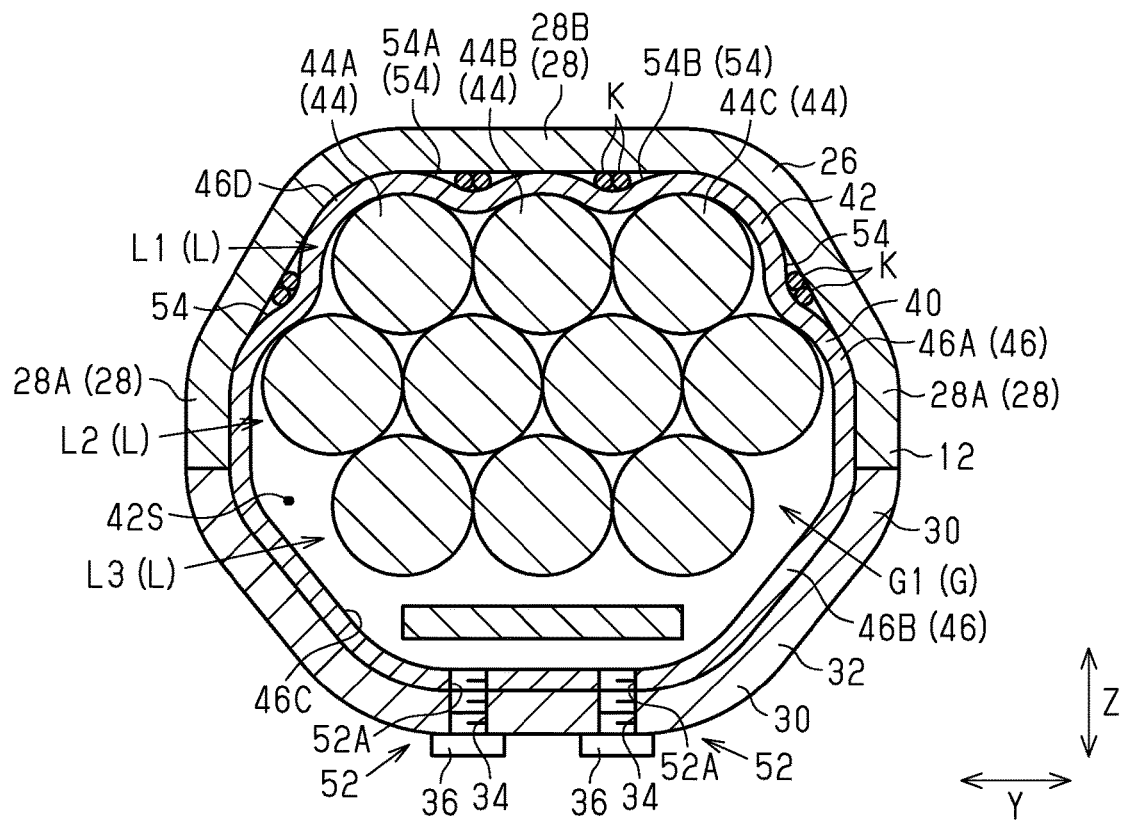
FIG. 3 is a transverse cross-sectional view of the bicycle battery pack and its attaching structure taken along section line 3-3 in FIG. 1.

As shown in FIG. 3, the battery pack 40 includes a housing 42 and a plurality of battery cells 44. The material of the housing 42 includes a resin material. As shown in FIG. 2, the housing 42 has a dimension in the longitudinal direction X that is greater than dimensions in the other directions. In a state where the battery pack 40 is attached to the battery attachment 22, the longitudinal direction X extends in the longitudinal direction of the frame 12. As shown in FIG. 3, the housing 42 includes an accommodation compartment 42S. The battery cells 44 are accommodated in the accommodation compartment 42S of the housing 42.

The battery pack 40 shown in FIG. 2 has a contour that is, for example, substantially plane-symmetric with respect to a plane extending through the center of the battery pack 40 in the widthwise direction Y and orthogonal to the widthwise direction Y. The contour of the battery pack 40 corresponds to the contour of the housing 42.

The housing 42 is configured to be located on the frame 12. The housing 42 is configured to be at least partially accommodated in the accommodation cavity 26S defined in the frame 12. The housing 42 includes a pair of side walls 46. The housing 42 further includes a pair of ends 48.

In a state located on the frame 12, the side walls 46 extend in the longitudinal direction of the frame 12. The side walls 46 include a first side wall 46A and a second side wall 46B. The first side wall 46A is covered by the walls 28 of the battery accommodation portion 26 (refer to FIG. 3), while the second side wall 46B is covered by the cover body 32 of the cover 30 (refer to FIG. 3). The first side wall 46A is curved so that the two ends in the widthwise direction Y are located downward in the height-wise direction Z from the middle in the widthwise direction Y. The second side wall 46B is curved so that the two ends in the widthwise direction Y are located upward in the height-wise direction Z from the middle in the widthwise direction Y. The two ends of the first side wall 46A in the widthwise direction Y are respectively continuous with the two ends of the second side wall 46B. The first side wall 46A and the second side wall 46B are formed integrally with each other. The first side wall 46A is shaped to extend along the side walls 28A and the main wall 28B of the walls 28 of the battery accommodation portion 26. The second side wall 46B is shaped to extend along the cover body 32.

The ends 48 of the housing 42 are continuous with the two ends of each side wall 46 in the longitudinal direction X. The ends 48 of the housing 42 include a first end 48A and a second end 48B. In a state where the battery pack 40 is attached to the battery attachment 22, the first end 48A is included in the end of the battery pack 40 located at one side X1 in the longitudinal direction X. The middle portion of the first end 48A in the widthwise direction Y projects toward one side X1 in the longitudinal direction X.

In a state where the battery pack 40 is attached to the battery attachment 22, the second end 48B is included in the end of the battery pack 40 that is located at the other side X2 in the longitudinal direction X. The middle portion of the second end 48B in the widthwise direction Y projects toward the other side X2 in the longitudinal direction X. The second end 48B is configured to be supportable by the battery holder 24. The second end 48B of the housing 42 includes an engagement portion 48C that is engageable with the battery holder 24. The engagement portion 48C of the second end 48B of the housing 42 includes one of a recess that is recessed toward one side X1 in the longitudinal direction X, and a projection that projects toward the other side X2 in the longitudinal direction X. The battery holder 24 is configured to support the second end 48B in an attachable and removable manner. The battery holder 24 includes an engagement portion 24A that is engageable with the engagement portion 48C of the second end 48B of the housing 42. The engagement portion 24A of the battery holder 24 includes one of a projection that projects toward one side X1 in the longitudinal direction X, and a recess that is recessed toward the other side X2 in the longitudinal direction X. The projection or recess of the engagement portion 24A of the battery holder 24 is engageable with the engagement portion 48C of the second end 48B of the housing 42. The battery holder 24 is attached by bolts or the like to the battery attachment 22.

Figure 4:
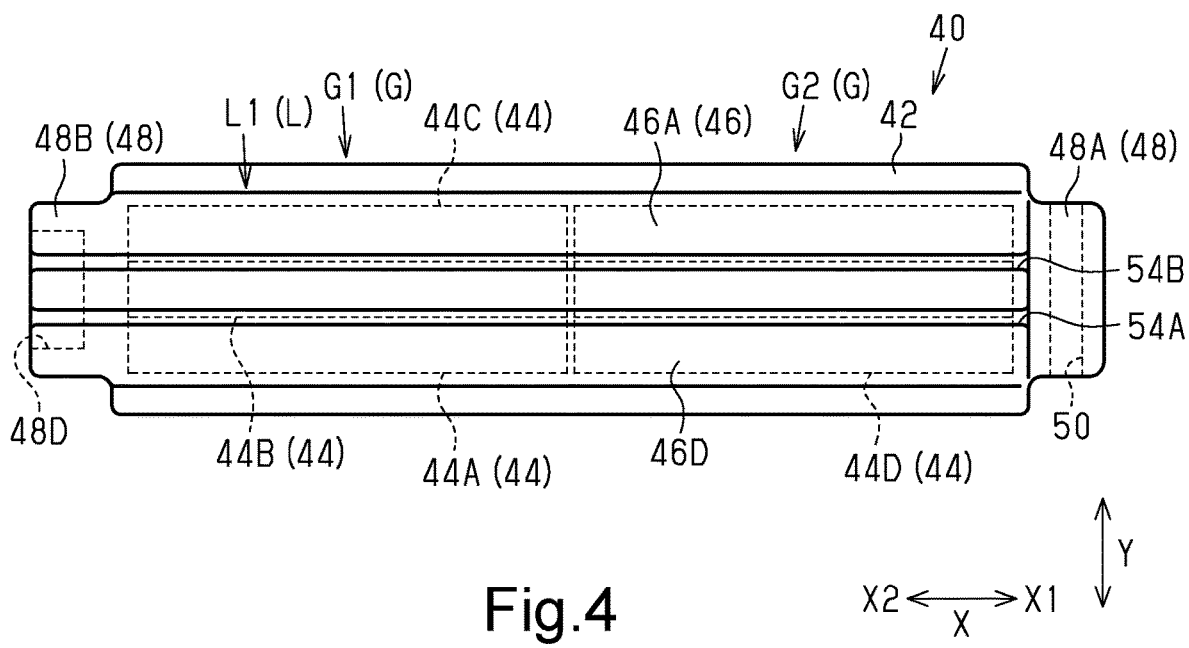
FIG. 4 is a top plan view of the bicycle battery pack shown in FIG. 2.

As shown in FIG. 4, the first end 48A of the housing 42 is provided with an engagement portion 50. In one example, the engagement portion 50 includes a through hole that extends through the battery pack 40 in the widthwise direction Y. As shown in FIG. 2, the engagement portion 50 is provided at a location corresponding to the first hole 26B and the second hole 26C of the battery accommodation portion 26. The engagement portion 50 is engageable with the engagement portion 38 of the battery attachment 22. The engagement portion 50 includes female threads that are engageable with the male threads of the first engagement portion 38A and the second engagement portion 38B. In the present embodiment, the engagement portion 50 includes a sleeve 50A that is fixed to the housing 42 and opens at two sides of the housing 42 in the widthwise direction Y. Preferably, the sleeve 50A is formed from a metal material. The two ends of the sleeve 50A include the female threads that are engageable with the male threads of the first engagement portion 38A and the second engagement portion 38B. The sleeve 50A can be formed to be entirely tubular. In a further example, the engagement portion 50 can be configured so that the female threads, which are engageable with the male threads of the first engagement portion 38A and the second engagement portion 38B, are formed integrally with the housing 42. The engagement portion 50 can be configured without the female threads. In this case, for example, the second engagement portion 38B is omitted, the first engagement portion 38A has a length so that it can extend through the accommodation cavity 26S in the widthwise direction Y, and a female thread is formed on the wall of the second hole 26C in the battery accommodation portion 26. In a state inserted through the first hole 26B of the battery accommodation portion 26 and the hole of the engagement portion 50, the first engagement portion 38A is engaged with the female thread formed on the wall of the second hole 26C to support the battery pack 40 in the battery accommodation portion 26 with the first engagement portion 38A. The second hole 26C including the wall with the female thread can be configured as a blind hole that opens in the accommodation cavity 26S.

The relationship of the first end 48A and the second end 48B of the housing 42 can be changed in any manner. In one example, in a state where the battery pack 40 is attached the battery attachment 22, the first end 48A can be the end of the battery pack 40 located at the other side X2 of the battery pack 40 in the longitudinal direction X. In a state where the battery pack 40 is attached to the battery attachment 22, the second end 48B can be the end located at the side X1 of the battery pack 40 in the longitudinal direction X. In this case, the first hole 26B and the second hole 26C of the battery accommodation portion 26 are formed proximate to the end at the other side X2 of the battery accommodation portion 26 in the longitudinal direction X, and the battery holder 24 is provided proximate to the side X1 of the battery accommodation portion 26 in the longitudinal direction X.

Figure 5:
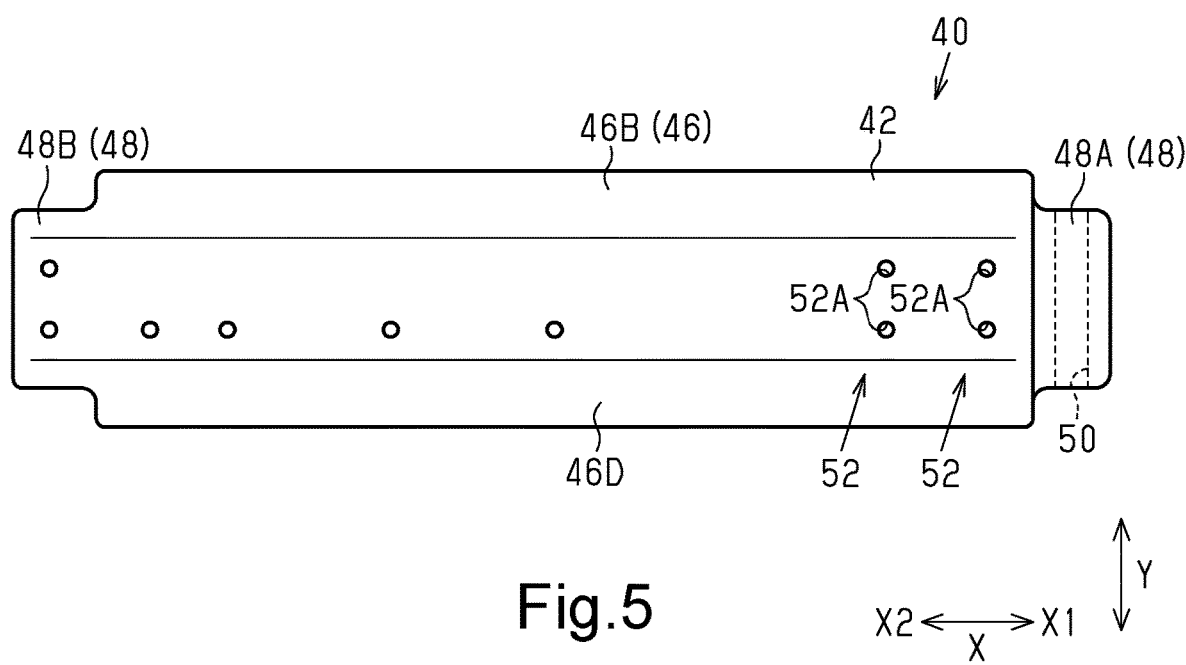
FIG. 5 is a bottom plan view of the bicycle battery pack shown in FIG. 2.

As shown in FIGS. 3 and 5, the battery pack 40 further includes a cover attaching portion 52. The cover attaching portion 52 is configured to allow for attachment of the cover 30. The cover attaching portion 52 is, for example, provided at an intermediate portion of the second side wall 46B of the housing 42 in the widthwise direction Y. Preferably, the battery pack 40 includes a plurality of the cover attaching portions 52. The cover attaching portions 52 include the holes 52A that each have a female thread. In a state where the battery pack 40 is attached to the battery attachment 22, the cover attaching portions 52 are exposed to the outside from the first opening 26A of the battery accommodation portion 26. In one example, the number of the cover attaching portions 52 is ten. The number and layout of the cover attaching portions 52 can be changed in any manner.

The bolts 36 are inserted into the holes 52A via the through holes 34 of the cover 30 to attach the cover 30 to the battery pack 40. In a state where the battery pack 40 is accommodated in the accommodation cavity 26S of the battery accommodation portion 26, the battery pack 40 is protected from the outside by the battery accommodation portion 26 and the cover 30. After the battery pack 40 is attached to the battery attachment 22, the cover 30 can be attached to the battery pack 40. In a state where the cover 30 is attached to the battery pack 40, the battery pack 40 can be attached to the battery attachment 22. The attaching structure 20 can be configured without the cover 30 and the cover attaching portions 52.

The battery pack 40 further includes an electrical connector 48D shown in FIG. 4, a display (not shown) and a switch (not shown). The display can show, for example, the remaining voltage of the battery pack 40. The switch, for example, turns on and off the power of the battery pack 40. The display and the switch are provided on the housing 42. At least one of the display and the switch can be omitted from the battery pack 40.

The electrical connector 48D is provided on the housing 42. The battery holder 24 (refer to FIG. 2) includes a plug electrically connected to an electric component of the bicycle 10 (refer to FIG. 1). In a state where the housing 42 is held by the battery holder 24, the electrical connector 48D is electrically connectable to the plug of the battery holder 24. The connection of the plug of the battery holder 24 with the electrical connector 48D allows the battery pack 40 to supply the electric component with power. The electrical connector 48D can be further configured to be connectable to a charger in order to charge the battery cells 44 via the electrical connector 48D.

As shown in FIG. 3, an outer portion 46D of the side walls 46 of the housing 42 includes at least one groove 54 (two shown in the illustrated embodiment). In a state where the housing 42 is accommodated in the accommodation cavity 26S, the grooves 54 are formed in a portion of the side wall 46 facing toward the walls 28 of the battery accommodation portion 26. The grooves 54 are formed so that a linear member K can be received in the grooves 54. The grooves 54 are formed so that a plurality of linear members K can be received in the grooves 54. In one example, the linear member K includes one of an electric cable, a Bowden cable, and a hydraulic cable. The electric cable can include a signal wire that transmits electric signals, a power line that transmits power, or an electric wire for Power Line Communication (PLC). The Bowden cable connects, for example, an operation device to a shifting device, a brake device, an adjustable seatpost, or a suspension. The hydraulic cable connects, for example, an operation device to a shifting device, a brake device, an adjustable seatpost, or a suspension. In one example, each of the grooves 54 has a substantially U-shaped cross section in the widthwise direction. Preferably, the width of each of the grooves 54 is greater than or equal to the sum of the outer diameters of at least two linear members K. Preferably, the width of each of the grooves 54 is greater than or equal to 2 mm and less than or equal to 20 mm. Preferably, each of the grooves 54 has a depth that is greater than or equal to the outer diameter of the received linear member K.

Preferably, the battery attachment 22 includes a guide that guides the linear member K. The guide is configured by the surface of the battery attachment 22 at the side of the accommodation cavity 26S to hold part of the linear member K in an attachable and removable manner so that the linear member K does not move in the widthwise direction Y. The guide is hook-shaped. Preferably, the guide is hook-shaped. Preferably, guides are provided in intervals in the longitudinal direction X. By providing the guide, movement of the linear member K can be restricted in a state where the battery attachment 22 is removed from the battery pack. The guide is provided on the battery attachment 22 so that the linear member K is laid out at a position corresponding to the grooves 54 in a state where the housing 42 is located on the frame 12. When attaching the battery pack to the battery attachment 22, the groove allows the linear member K to be easily accommodated in the grooves 54. Preferably, in a case in which the guide is located at a position facing the grooves 54, the width and depth of each of the grooves 54 are such that the guide can be accommodated in the grooves 54.

The battery cells 44 are accommodated in the housing 42. The battery cells 44 are cylindrical. The battery cells 44 include at least a first battery cell 44A and a second battery cell 44B. In one example, the battery cells 44 further include a third battery cell 44C and a fourth battery cell 44D.

As shown in FIG. 4, in a state in which the housing 42 is located on the frame 12, the battery cells 44 configure a cell group G in which the battery cells 44 are aligned in a direction intersecting the longitudinal direction of the frame 12. Preferably, the battery cells 44 configure a plurality of cell groups G. The cell groups G are aligned in the longitudinal direction of the frame 12 in a state where the housing 42 is located on the frame 12. In one example, the cell groups G include a first cell group G1 and a second cell group G2. Preferably, the battery cells 44 configuring each cell group G are laid out in the accommodation compartment 42S of the housing 42 shown in FIG. 3 using a resin film, a holding device, or the like so that the battery cells 44 are held in place.

Figure 6:
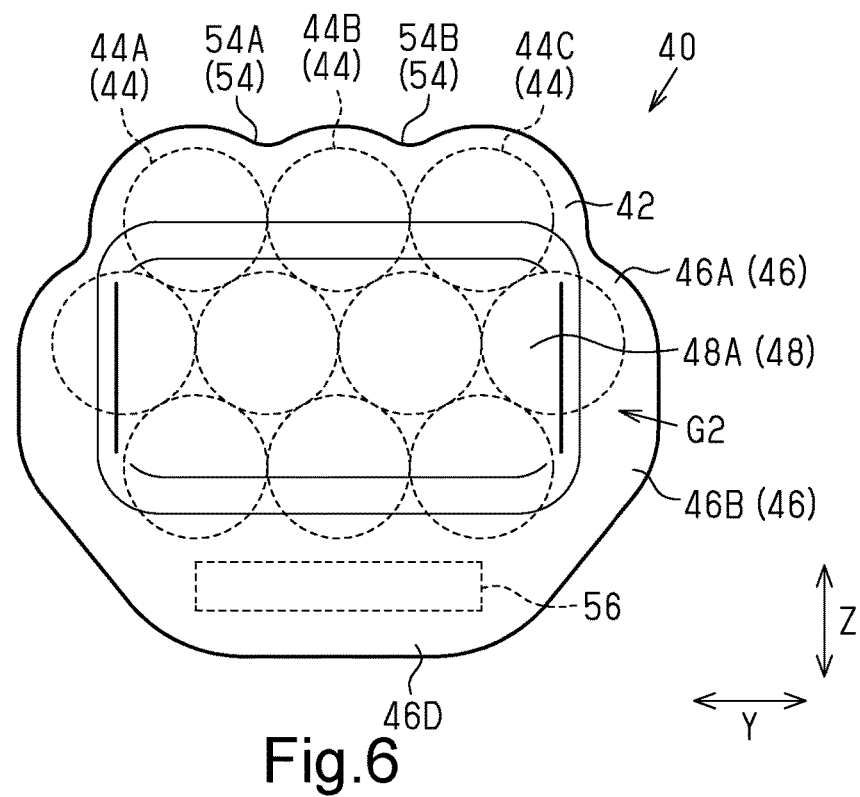
FIG. 6 is a front end view of the bicycle battery pack shown in FIG. 2.

The first cell group G1 includes at least the first battery cell 44A, the second battery cell 44B, and the third battery cell 44C. The first cell group G1 shown in FIG. 3 includes ten battery cells 44. The first cell group G1 of the battery cells 44 shown in FIG. 3 includes a plurality of cell lines L each extending in the widthwise direction Y. The first cell group G1 shown in FIG. 3 includes three cell lines L1 to L3. The three cell lines L1 to L3 are laid out in the height-wise direction Z in the order of the first cell line L1, the second cell line L2, and the third cell line L3 from the upper side toward the lower side. The first cell group G1 is laid out so that the battery cells 44 included in each cell line L is shifted by one-half of a battery cell 44 in the widthwise direction Y from the battery cells 44 included in a cell line L that is adjacent in the height-wise direction Z. In a state where the housing 42 is located on the frame 12, the first battery cell 44A and the second battery cell 44B are aligned in a direction intersecting the longitudinal direction of the frame 12. In a state where the housing 42 is located on the frame 12, the first battery cell 44A, the second battery cell 44B, and the third battery cell 44C are aligned in a direction intersecting the longitudinal direction of the frame 12. The first battery cell 44A, the second battery cell 44B and the third battery cell 44C are each located in the housing 42 so as to face an inner portion 46C of the side wall 46. FIGS. 3, 4 and 6 show one example of the layout of the first battery cell 44A, the second battery cell 44B and the third battery cell 44C in the housing 42. The first battery cell 44A corresponds to any one of the battery cells 44 in the first cell group G1 laid out in the housing 42 facing the inner portion 46C of the side wall 46. The second battery cell 44B corresponds to any one of the battery cells 44 in the first cell group G1 laid out in the housing 42 adjacent to the first battery cell 44A and facing the inner portion 46C of the first side wall 46A. The third battery cell 44C corresponds to any one of the battery cells 44 in the first cell group G1 laid out in the housing 42 adjacent to the second battery cell 44B and facing the inner portion 46C of the first side wall 46A. The first battery cell 44A, the second battery cell 44B and the third battery cell 44C can be aligned in the height-wise direction Z or in a direction inclined relative to the widthwise direction Y. Further, the direction in which the first battery cell 44A and the second battery cell 44B are aligned can differ from the direction in which the second battery cell 44B and the third battery cell 44C are aligned.

The second cell group G2 shown in FIG. 4 includes at least the fourth battery cell 44D. The second cell group G2 includes ten battery cells 44. In one example, the number of the battery cells 44 configuring the first cell group G1 is equal to the number of the battery cells 44 configuring the second cell group G2. The battery cells 44 in the second cell group G2 are aligned in the same manner as those in the first cell group G1. In a state where the housing 42 is located on the frame 12, at least one of the first battery cell 44A, the second battery cell 44B, and the third battery cell 44C is aligned with the fourth battery cell 44D in the longitudinal direction of the frame 12. FIG. 4 shows one example of the layout of the fourth battery cell 44D in the housing 42. The fourth battery cell 44D corresponds to any one of the battery cells 44 in the second cell group G2 laid out in the housing 42 adjacent to at least one of the first to third battery cells 44A to 44C facing the inner portion 46C of the first side wall 46A. The relationship between the battery cells 44 configuring the first cell group G1 and the battery cells 44 configuring the second cell group G2 can be changed. For example, the second cell group G2 can include the first to third battery cells 44A to 44C, and the first cell group G1 can include the fourth battery cell 44D. Further, the first cell group G1 and the second cell group G2 can both include the first to third battery cells 44A to 44C. In this case, the fourth battery cell 44D corresponds to any one of the battery cells 44 in one of the first cell group G1 and the second cell group G2 that is adjacent to at least one of the first to third battery cells 44A to 44C in the other one of the first cell group G1 and the second cell group G2.

A circuit board 56 is accommodated in the housing 42. Elements (not shown) configuring an electronic control unit that controls the battery pack 40 are mounted on the circuit board 56. In one example, the circuit board 56 is located inside the housing 42 downward from the battery cells 44 in the height-wise direction Z. The circuit board 56 can be located inside the housing 42 between the battery cells 44 and the electrical connector 48D.

The relationship of the grooves 54 and the battery cells 44 will now be described with reference to FIGS. 3 and 4. The grooves 54 are recessed toward a region between two adjacent ones of the battery cells 44. In a direction orthogonal to the direction in which the battery cells 44 are aligned, the region between two adjacent ones of the battery cells 44 is surrounded by circumferential surfaces of the adjacent battery cells 44 and a tangential line contacting the circumferential surfaces of the adjacent battery cells 44. The depths of the grooves 54 can be increased from the depths shown in FIG. 3 so that the grooves 54 are formed to intersect the tangential line contacting the circumferential surfaces of the adjacent battery cells 44 in a cross section orthogonal to the direction in which the battery cells 44 are aligned. At least one of the grooves 54 is recessed toward a region between the first battery cell 44A and the second battery cell 44B. In a state where the housing 42 is located on the frame 12, each of the grooves 54 is formed extending from one end 48 of the housing 42 to the other end 48 of the housing 42 in the longitudinal direction of the frame 12. Each of the grooves 54 is formed to be entirely straight. The grooves 54 include a first groove 54A and a second groove 54B. The grooves 54 can be formed between adjacent ones of all of the battery cells 44 configuring the first cell line L1. The groove 54 can be formed between a battery cell 44 in the first cell line L1 located at one of the two ends in the widthwise direction Y and a battery cell 44 in the second cell line L2 located at one of the two ends in the widthwise direction Y.

The first groove 54A is recessed in the outer portion 46D of the side wall 46 toward a region between the first battery cell 44A and the second battery cell 44B. In a view taken from above in the height-wise direction Z, the first groove 54A extends straight overlapping a region between two of the battery cells 44 in the first cell group G1 and a region between two of the battery cells 44 in the second cell group G2. The first groove 54A is formed extending from one end 48 of the housing 42 to the other end 48 of the housing 42 in the longitudinal direction X.

The second groove 54B is recessed in the outer portion 46D of the side wall 46 toward a region between the second battery cell 44B and the third battery cell 44C. In a view taken from above in the height-wise direction Z, the second groove 54B extends straight overlapping a region between two of the battery cells 44 in the first cell group G1 and a region between two of the battery cells 44 in the second cell group G2. The second groove 54B is formed extending from one end 48 of the housing 42 to the other end 48 of the housing 42 in the longitudinal direction X.

The procedures for attaching the battery pack 40 to the battery attachment 22 will now be described with reference to FIGS. 2 and 3. The battery pack 40 is, for example, attached to the battery attachment 22 through the procedures described below. In a first procedure, a user engages the engagement portion 48C of the housing 42 of the battery pack 40 with the engagement portion 24A of the battery holder 24 and pivots the battery pack 40 about the engagement portion 24A. In a second procedure, in a state where the battery pack 40 is located at a predetermined position in the battery accommodation portion 26, the user engages the engagement portion 38 with the engagement portion 50. In a third procedure, the cover 30 is attached to the battery pack 40. Through the procedures described above, the battery pack 40 is attached to the battery attachment 22 as shown in FIG. 1. The third procedure can be performed before the second procedure. Preferably, to lay out the linear member K in the groove 54, before the first procedure, the linear member K is laid out in the battery accommodation portion 26 using the guide or the like of the linear member K provided in the battery attachment 22.

Modifications

The description related with the above embodiment exemplifies an applicable form of the bicycle battery pack according to the present invention and is not intended to limit the forms. In addition to the embodiment described above, the bicycle battery pack according to the present invention is applicable to, for example, modifications of the above embodiment that are described below and combinations of at least two of the modifications that do not contradict each other. Same reference numerals are given to those components that are the same as the corresponding components of the above embodiment. Such components will not be described in detail.

Figure 7:
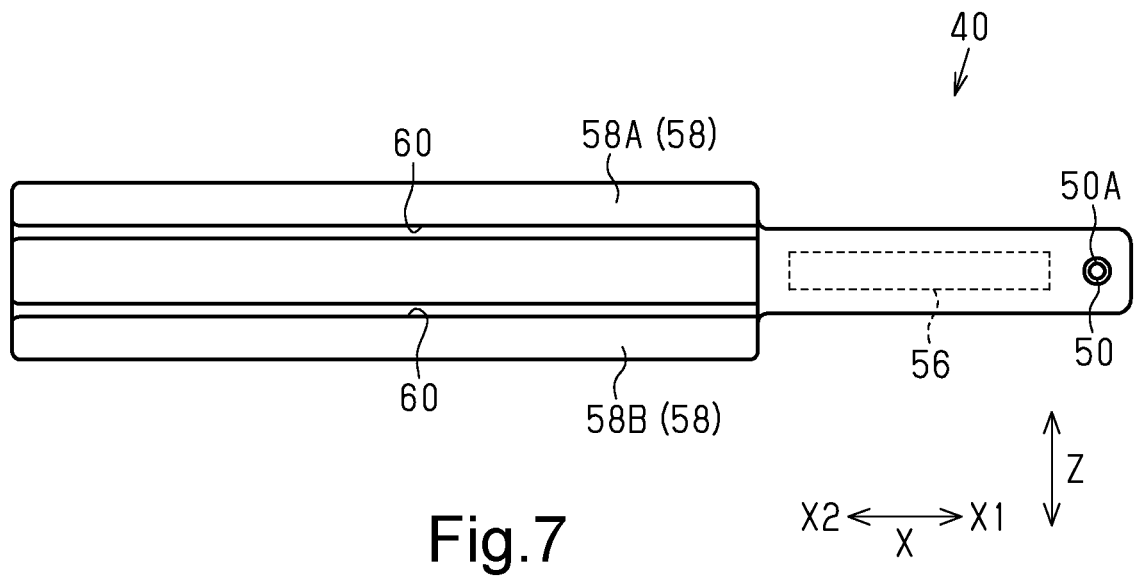
FIG. 7 is a side view of a bicycle battery pack in accordance with a first modification.
Figure 8:
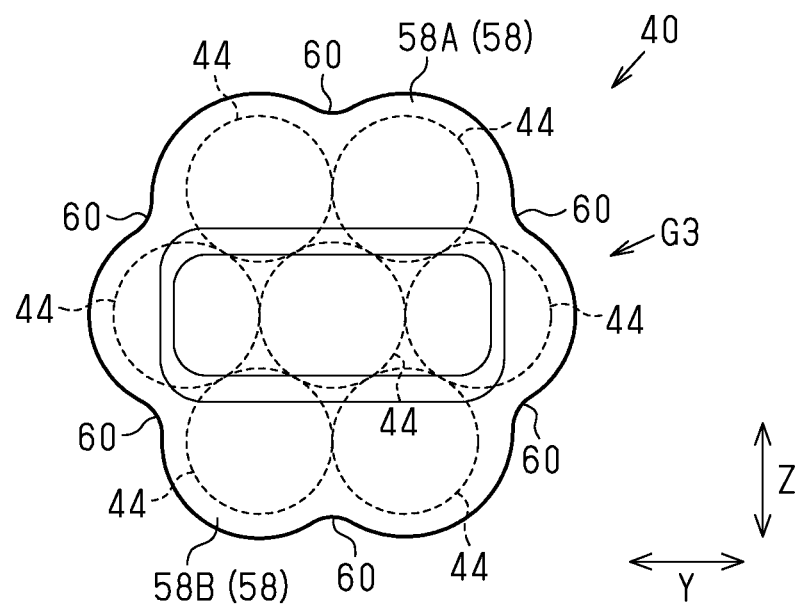
FIG. 8 is a front end view of the bicycle battery pack shown in FIG. 7.

As shown in FIGS. 7 and 8, a groove 60 can also be formed in a portion of the battery pack 40 facing the cover body 32. For example, the battery pack 40 shown in FIGS. 7 and 8 includes a pair of side walls 58 that are each provided with three of the grooves 60. The side walls 58 include a first side wall 58A facing toward the walls 28 of the battery accommodation portion 26 and a second side wall 58B facing toward the cover body 32. The grooves 60 are formed in the first side wall 58A and the second side wall 58B. The grooves 60 face the inner portion of the side walls 58 and are recessed toward regions between two adjacent ones of the battery cells 44. Each of the grooves 60 is formed so that the linear members K can be received in the grooves 60. Each of the grooves 60 is formed so that a plurality of the linear members K can be received in the grooves 60. Each of the grooves 60 is entirely formed to be straight. The grooves 60 can be provided extending from an end of the side walls 58 at the other side X2 in the longitudinal direction X to an intermediate portion. In FIGS. 7 and 8, a cell group G3 including the battery cells 44 can be located at the other side X2 in the longitudinal direction X, and the circuit board 56 can be located toward one side X1 in the longitudinal direction X from the cell group G3.

Figure 9:
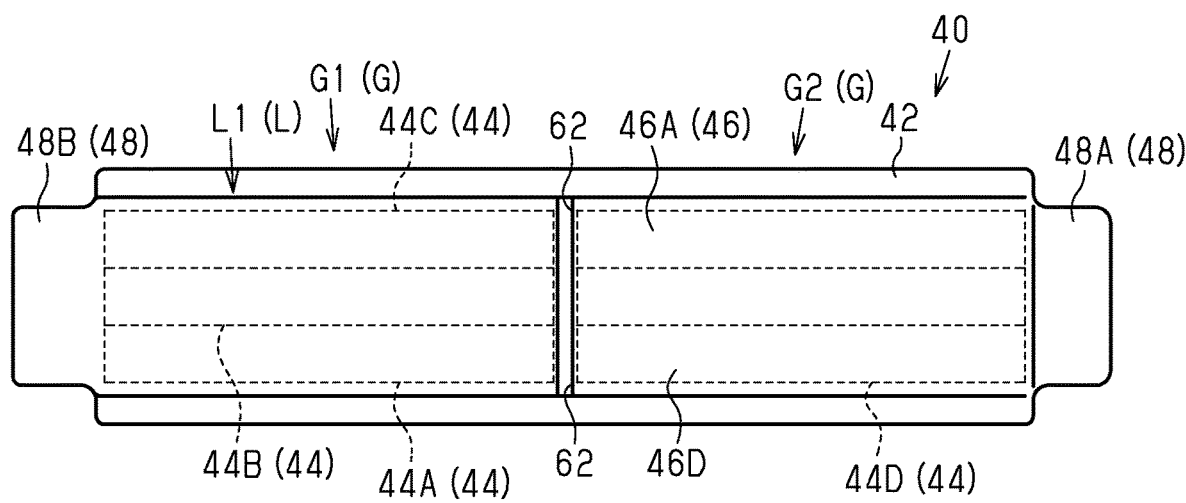
FIG. 9 is a top plan view of a bicycle battery pack in accordance with a second modification.

As shown in FIG. 9, the battery pack 40 can include a groove 62 that is recessed toward a region between two of the battery cells 44 that are aligned in the longitudinal direction X. The groove 62 is formed so that the linear member K can be received in the groove 62. The groove 62 is formed so that a plurality of the linear members K can be received in the groove 62. The groove 62 is formed to be entirely straight. The groove 62 extends in the widthwise direction Y. In a case where three or more cell groups G are aligned in the longitudinal direction X, a plurality of the grooves 62 can be provided. At least one of the grooves 62 can be shorter than the battery pack 40 in the widthwise direction Y. In this case, at least one end of the groove 62 is located toward the middle side from the end of the battery pack 40 in the widthwise direction Y.

Figure 10:
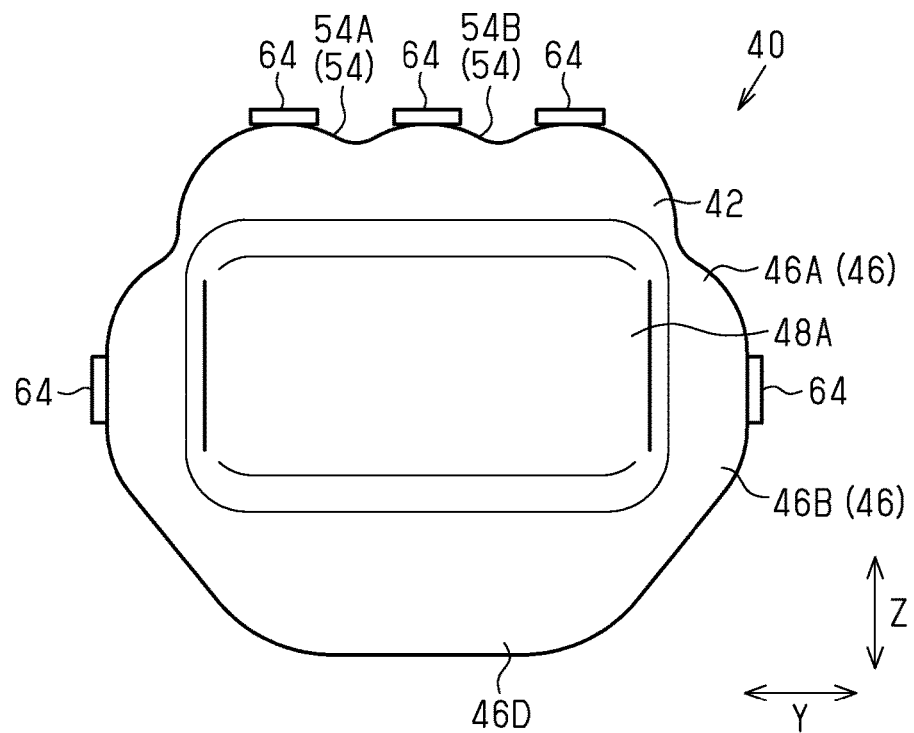
FIG. 10 is a front end view of a bicycle battery pack in accordance with a third modification.

As shown in FIG. 10, the battery pack 40 can further include a plurality of cushions 64. The cushions 64 are provided on the outer portion 46D of the side walls 46. The cushions 64 are provided on portions of the side walls 46 located proximate to the grooves 54. The cushions 64 can be provided proximate to all of the grooves 54 or be provided proximate to only some of the grooves 54. The cushions 64 can be provided at locations distant from the grooves 54. The cushions 64 are configured including, for example, an elastic material. The elastic material includes, for example, rubber and urethane. The cushions 64 can be flat and extend along the grooves 54 in the longitudinal direction X. Further, the cushions 64 can be shorter than the grooves 54 in the longitudinal direction X, and a plurality of cushions 64 can be provided in the longitudinal direction X. In short, the layout and shape of the cushions 64 can be changed as long as the cushions 64 are located between the frame 12 and the battery pack 40.

Figure 11:
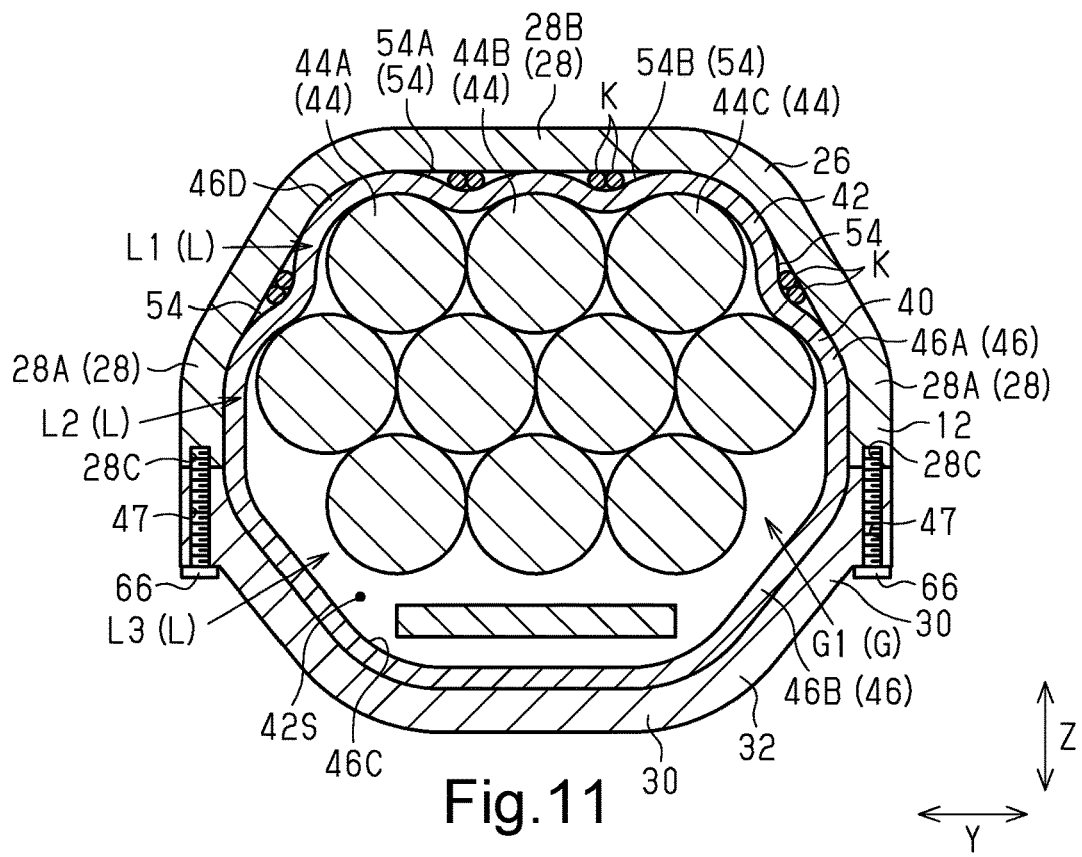
FIG. 11 is a cross-sectional view of the bicycle battery pack and a modified attaching structure in accordance with another modification.

As shown in FIG. 11, the holes 52A that are used to attach the cover 30 can be omitted from the housing 42 of the battery pack 40, and the cover 30 can be attached to the battery attachment 22. Female threads 28C are formed in the side walls 28A of the battery attachment 22. The two ends of the cover 30 in the widthwise direction Y include through holes 47 through which bolts 66 are inserted. The bolts 66 are inserted through the through holes 47 and fastened to the female threads 28C to attach the cover 30 to the battery accommodation portion 26.

Figure 12:
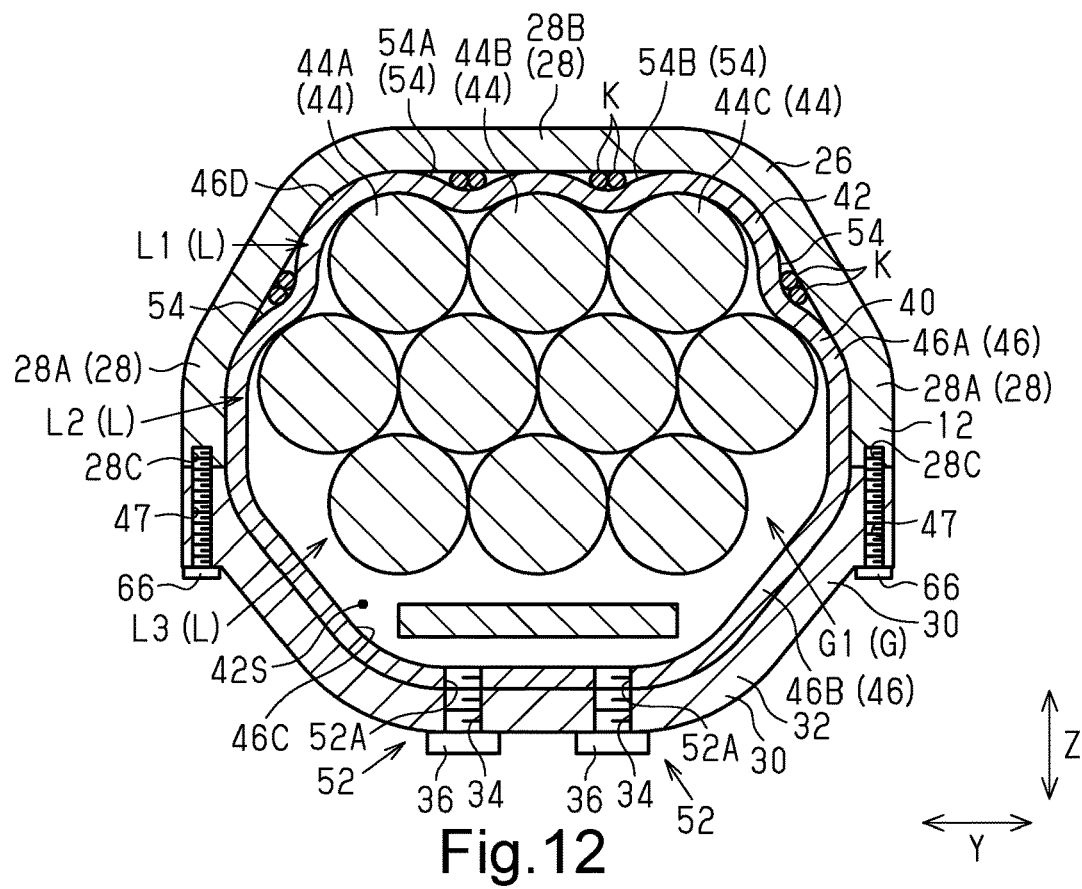
FIG. 12 is a cross-sectional view of the bicycle battery pack and a modified attaching structure in accordance with another modification.

As shown in FIG. 12, the holes 52A in the housing 42 of the battery pack 40 and the bolts 36 can be used to attach the cover 30 to the battery pack 40, and the female threads 28C in the battery accommodation portion 26 and the bolts 66 can be used to attach the cover 30 to the battery accommodation portion 26.

The battery cells 44 can have the form of polygonal rods. When the battery cells 44 have the form of square rods, adjacent battery cells 44 are spaced apart or inclined relative to each other to form a region between the adjacent battery cells 44, and the grooves 54 and 60 are recessed toward the regions between the battery cells 44.

At least one of the grooves 54, 60 and 62 can be formed so that only one linear member K can be received. In this case, the width of the grooves 54, 60 and 62 that can receive only one linear member K can be decreased from the width of the other grooves 54, 60 and 62.

At least one of the grooves 54, 60 and 62 can be partially bent or curved. At least one of the grooves 54, 60 and 62 can be partially varied in at least one of width and depth.

At least one of the width and depth of at least one of the grooves 54, 60 and 62 can differ from the width and depth of the other groove 54, 60 and 62. At least one of the grooves 54 can be shorter than the battery pack 40 in the longitudinal direction X. In this case, at least one end of the groove 54 is located toward the middle of the battery pack 40 from the end in the longitudinal direction X.

In each embodiment, the battery attachment 22 is provided on the down tube 12C, and the engagement portion 38 and the engagement portion 50 are located at the side of the head tube 12A. However, the engagement portion 38 and the engagement portion 50 can be located at the side of the seat tube 12E. The battery attachment 22 can be provided on the top tube 12B or the seat tube 12E. Instead of or in addition to the first opening 26A of the battery accommodation portion 26, an opening can be provided in the upper side in the height-wise direction Z or in one side in the widthwise direction Y.

The battery accommodation portion 26 including the accommodation cavity 26S can be omitted from the frame 12 of the bicycle 10. In this case, the battery pack 40 can be formed so that the two ends in the longitudinal direction X are held by the battery holder 24, which is attached to the frame 12, and a support (not shown).

What is claimed is:

1. A bicycle battery pack comprising:
a housing configured to be located on a frame of a bicycle; and
a plurality of battery cells accommodated in the housing, the plurality of battery cells including at least a first battery cell and a second battery cell,
the housing forming a side wall extending in a longitudinal direction of the frame in a state located on the frame,
an outermost portion of the side wall includes a plurality of grooves,
an innermost portion of the side wall defines an accommodation compartment in which an entirety of the plurality of battery cells are housed, the innermost portion of the side wall being disposed opposite the outermost portion and completely surrounding the plurality of battery cells, and
one of the plurality of grooves is recessed toward a region between the first battery cell and the second battery cell, each of the plurality of grooves has a length extending in the longitudinal direction of the frame, the plurality of grooves being configured to be disposed between the outermost portion of the side wall and the frame.

2. The bicycle battery pack according to claim 1, wherein the housing is configured to be at least partially accommodated in an accommodation cavity defined in the frame.

3. The bicycle battery pack according to claim 1, wherein the groove is formed so that a linear member can be received in the groove.

4. The bicycle battery pack according to claim 3, wherein the groove is formed so that a plurality of linear members can be received in the groove.

5. A bicycle battery pack comprising:
a housing configured to be located on a frame of a bicycle; and
a plurality of battery cells that are at least partially accommodated in the housing,
the housing forming a side wall extending in a longitudinal direction of the frame in a state located on the frame,
an outermost portion of the side wall including a plurality of grooves that are formed so that a plurality of linear members can be received in each of the groove plurality of grooves, each of the plurality of grooves having a length extending in the longitudinal direction of the frame,
an innermost portion of the side wall defining an accommodation compartment in which an entirety of the plurality of battery cells are housed, the innermost portion of the side wall being disposed opposite the outermost portion and completely surrounding the plurality of battery cells, and the plurality of grooves being configured to be disposed between the outermost portion of the side wall and the frame.

6. The bicycle battery pack according to claim 5, wherein the plurality of battery cells includes at least a first battery cell and a second battery cell.

7. The bicycle battery pack according to claim 6, wherein the groove is recessed in the outermost portion of the side wall toward a region between the first battery cell and the second battery cell.

8. The bicycle battery pack according to claim 1, wherein the first battery cell and the second battery cell are aligned in a direction intersecting the longitudinal direction of the frame in a state where the housing is located on the frame.

9. The bicycle battery pack according to claim 1, wherein the plurality of battery cells further includes a third battery cell;
the first battery cell, the second battery cell and the third battery cell are each located in the housing so as to face the innermost portion of the side wall; and
the plurality of grooves includes a first groove and a second groove, the first groove is recessed in the outermost portion of the side wall toward a region between the first battery cell and the second battery cell, and the second groove is recessed in the outermost portion of the side wall toward a region between the second battery cell and the third battery cell.

10. The bicycle battery pack according to claim 9, wherein
the first battery cell, the second battery cell and the third battery cell are aligned in a direction intersecting the longitudinal direction of the frame in a state where the housing is located on the frame.

11. The bicycle battery pack according to claim 10, wherein
the plurality of battery cells further includes a fourth battery cell; and
at least one of the first battery cell, the second battery cell and the third battery cell is aligned with the fourth battery cell in the longitudinal direction of the frame in a state where the housing is located on the frame.

12. The bicycle battery pack according to claim 1, wherein
the groove is formed extending from one end of the housing to another end of the housing in the longitudinal direction of the frame in a state where the housing is located on the frame.

13. The bicycle battery pack according to claim 1, wherein
the groove is formed to be entirely straight.

14. The bicycle battery pack according to claim 1, wherein
the battery cells are cylindrical.

15. The bicycle battery pack according to claim 1, wherein
the frame of the bicycle includes a wall defining an accommodation cavity configured to accommodate at least part of the bicycle battery pack, and
the plurality of grooves are formed in a portion of the side wall facing the wall in a state where the housing is accommodated in the accommodation cavity.

16. The bicycle battery pack according to claim 1, further comprising
a cushion provided on the outermost portion of the side wall.

17. The bicycle battery pack according to claim 16, wherein the cushion is provided in a portion of the side wall proximate to the groove.

\* \* \* \* \*